US008672421B2

(12) United States Patent
Eidenschink et al.

(10) Patent No.: US 8,672,421 B2
(45) Date of Patent: Mar. 18, 2014

(54) PRESSURE CONTROL VALVE ARRANGEMENT HAVING DIAPHRAGM VALVES FOR CONTROLLING A FLUID PRESSURE IN AN ABS BRAKE SYSTEM OF A VEHICLE, HAVING DIAPHRAGMS ARRANGED IN PARALLEL PLANES OR IN COPLANAR FASHION

(75) Inventors: Rainer Eidenschink, Munich (DE);
Wilfried Gerber, Geretsried (DE);
Friedbert Roether, Cleebronn (DE);
Jan Grebe, Starnberg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 442 days.

(21) Appl. No.: 12/737,190

(22) PCT Filed: Jun. 4, 2009

(86) PCT No.: PCT/EP2009/003997
§ 371 (c)(1),
(2), (4) Date: Apr. 7, 2011

(87) PCT Pub. No.: WO2009/152958
PCT Pub. Date: Dec. 23, 2009

(65) Prior Publication Data
US 2011/0175440 A1 Jul. 21, 2011

(30) Foreign Application Priority Data

Jun. 17, 2008 (DE) .......................... 10 2008 028 439

(51) Int. Cl.
*B60T 8/36* (2006.01)
(52) U.S. Cl.
USPC .................................. 303/119.1; 303/119.3

(58) Field of Classification Search
USPC .................. 303/119.1, 119.2, 119.3, 127, 40; 137/627.5
See application file for complete search history.

(56) References Cited

U.S. PATENT DOCUMENTS 3,760,843 A 9/1973 Larner
3,977,734 A * 8/1976 Ronnhult et al. .......... 303/119.3
(Continued)

FOREIGN PATENT DOCUMENTS

CH 375 535 4/1964
CN 101290074 10/2008
(Continued)

OTHER PUBLICATIONS

European Patent Office, International Preliminary Report on Patentability and Written Opinion, Dec. 29, 2010, from International Patent Application No. PCT/EP2009/003997, filed on Jun. 4, 2009.

(Continued)

*Primary Examiner* — Pamela Rodriguez
(74) *Attorney, Agent, or Firm* — Kenyon & Kenyon LLP (57) ABSTRACT

A pressure control valve arrangement is described for controlling the fluid pressure in an ABS brake system of a vehicle in such a manner that, in the event of a tendency of individual wheels of the vehicle to lock, the brake pressure in associated brake cylinders can be adaptively adjusted, at least two diaphragm valves which have diaphragms loaded by spring elements, as well as at least one electromagnetic control valve which can be activated by an electronic control device for the pilot control of the diaphragm valves. Also described is a method for producing the pressure control valve arrangement.

24 Claims, 4 Drawing Sheets

(56) References Cited

U.S. PATENT DOCUMENTS

| | | | |
|---|---|---|---|
| 4,449,759 A | 5/1984 | Eder | |
| 6,050,654 A * | 4/2000 | Gegalski et al. | 303/119.2 |
| 6,206,487 B1 * | 3/2001 | Nakamura et al. | 303/118.1 |

FOREIGN PATENT DOCUMENTS

| | | |
|---|---|---|
| DE | 2 204 394 | 10/1972 |
| DE | 25 17 571 | 10/1975 |
| DE | 29 38 437 | 4/1981 |
| DE | 29 51 297 | 7/1981 |
| DE | 31 27 775 | 2/1983 |
| DE | 36 37 415 | 5/1988 |
| DE | 38 25 549 | 2/1990 |
| DE | 197 01 200 | 7/1998 |
| DE | 199 18 070 | 12/1999 |
| DE | 101 56 773 | 6/2003 |
| DE | 10 2005 018 888 | 11/2006 |
| EP | 0 031 903 | 7/1983 |
| EP | 0 154 784 | 9/1985 |
| EP | 0 190 414 | 8/1986 |
| EP | 0 498 584 | 8/1992 |
| GB | 1497150 | 1/1978 |
| JP | 50145770 | 11/1975 |
| JP | 5657545 | 5/1981 |
| JP | 2002528680 | 9/2002 |
| WO | 2008/034525 | 3/2008 |

OTHER PUBLICATIONS

European Patent Office, Translation of International Preliminary Report on Patentability and Written Opinion, Jan. 27, 2011, from International Patent Application No. PCT/EP2009/003997, filed on Jun. 4, 2009.

* cited by examiner

PRESSURE CONTROL VALVE ARRANGEMENT HAVING DIAPHRAGM VALVES FOR CONTROLLING A FLUID PRESSURE IN AN ABS BRAKE SYSTEM OF A VEHICLE, HAVING DIAPHRAGMS ARRANGED IN PARALLEL PLANES OR IN COPLANAR FASHION

FIELD OF THE INVENTION

The present invention relates to a pressure control valve arrangement for controlling the fluid pressure in an ABS brake system of a vehicle in such a manner that, in the event of a tendency of individual wheels of the vehicle to lock, the brake pressure in associated brake cylinders can be adaptively adjusted, at least two diaphragm valves which have diaphragms loaded by spring elements, as well as at least one electromagnetic control valve which can be activated by an electronic control device for the pilot control of the diaphragm valves, and to a method for producing said pressure control valve arrangement.

BACKGROUND INFORMATION

ABS (anti-lock system) prevents locking of the wheels and comes into operation when there is a demand for a greater frictional connection between a tire and the road surface than can be transmitted, that is, when the driver over-brakes. In the event of over-braking, the central electronic control unit of the ABS brake system detects the tendency of one or more wheels to lock from rotational speed sensor signals and calculates therefrom the activation of the pressure control valve arrangement acting on the associated brake cylinder. The brake pressure is then adjusted by means of the pressure control valve arrangement to an optimal slip, the brake pressure being reduced, maintained or built up according to the wheel behavior and therefore according to the frictional relationship between tire and road surface.

A generic pressure control valve arrangement of an ABS brake system is discussed in German patent document DE 101 56 773 A1. For ABS brake systems of vehicles, single-channel pressure control valves with and without a relay effect are generally used. Pressure control valve arrangements with a relay effect are used in semitrailers and draw-bar trailers. ABS pressure control valve arrangements without a relay effect, to which the present invention relates, find application in all other vehicles, for example in utility vehicles, buses and semitrailer tractors as well as in trailers. Pressure control valve arrangements without a relay effect make use of 3/2-way solenoid valves as pilot control valves of diaphragm valves, an electronic control device activating the 3/2-way solenoid valves in order to be able to execute the functions "maintain pressure", "reduce pressure" and "build up pressure" necessary for ABS operation. During a braking operation without an ABS response (no tendency of a wheel to lock), the pressure medium, usually air, flows through the pressure control valve arrangements unimpeded in both directions as the brake cylinders are pressurized and vented. It is thereby ensured that the operation of the service brake system is not influenced by the ABS pressure control valve arrangement.

SUMMARY OF THE INVENTION

It is an object of the exemplary embodiments and/or exemplary methods of the present invention to develop a pressure control valve arrangement of the type mentioned in the introduction in such a manner that it is simpler to produce and assemble. At the same time, a corresponding method for producing such a pressure control valve arrangement is to be specified.

This object may be achieved according to the exemplary embodiments and/or exemplary methods of the present invention by the features described herein.

The present invention provide for openings for inserting or inlaying diaphragms are provided in a surface of a housing part of the housing, and edges of the diaphragms are held between opening edges of the openings and a further housing part of the housing, the opening edges of the openings lying in a common plane or in parallel planes and the surface normals of the opening edges of the openings being oriented in the same direction.

"A" surface should be understood here to mean a single unified surface of the housing component, that is, for example, a lateral surface, an end surface or a bottom surface.

A "surface normal" should be understood here to mean a perpendicular erected on the corresponding free surface which is oriented away from or projects away from this free surface.

A pressure control valve arrangement having these features can then be at least partially produced and assembled in a simple manner using the following steps:
  a) molding the at least two diaphragms,
  b) arranging the one housing part in such a manner that the surface normals of the opening edges of the openings are parallel to an assembly direction,
  c) placing the diaphragms of the diaphragm valves, in the assembly direction, into the openings in such a manner that the diaphragm edges rest on the opening edges, and then
  d) placing the spring elements on the diaphragms in the assembly direction,
  e) placing the further housing part onto the one housing part in the assembly direction in such a manner that, on the one hand, the diaphragm edges are fixed between the one housing part and the further housing part and, on the other hand, the spring elements bear against the diaphragms and the further housing part.

The diaphragms may be produced from an elastomer by molding, whereby, after being removed from the mold, they are optionally joined to one another by injected-on seals made of elastomer.

Because the openings for the diaphragms are arranged side-by-side on a surface, while the opening edges of the openings lie in a common plane (coplanarly) or in parallel planes and the surface normals of the opening edges of the openings are also oriented in the same direction, the diaphragms, optionally joined by injected-on seals, can be introduced into or inlaid into the openings from a single side, which may be from above. These measures simplify the production and assembly of a pressure control valve arrangement as compared to solutions of the prior art, in which the openings for the diaphragms are arranged on different surfaces of the housing, and assembly of the diaphragms is therefore possible only from several assembly directions, necessitating, for example, a resetting of the housing in the tool and a larger number of assembly steps.

Furthermore, no further components are needed to hold the edges of the diaphragms in the housing, as they are fixed between the one housing part and the further housing part, for example by a press fit.

The measures set forth herein provide for advantageous developments or improvements of the present invention specified herein.

According to an exemplary measure, all the screw connections for the fluid lines connected to the pressure control valve arrangements are formed in the housing part having the openings for the diaphragms, this housing part being formed by a light alloy die casting. Especially, this housing part may consist of a pressure die-cast aluminum component. In that case the strength and stiffness of the material are sufficiently high for threaded connections for fluid lines to be provided directly, that is without the provision of inserts, in the housing part.

According to a development, the spring elements which load the diaphragms of the diaphragm valves bear at one end centrally against the diaphragms and at the other against the further housing part, blind bores facing towards the one housing part for at least partially receiving the spring elements being provided in the further housing part. By means of the blind bores, the spring elements are automatically centered on the one housing part and fixed in their assembled position upon installation of the further housing part.

Especially, the further housing part may be formed by a plastics injection molding, at least one valve seat of the at least one electromagnetic control valve being formed integrally with the further housing part. After being molded together with the further housing part, this valve seat then no longer needs to be processed, for example machined, as the surface quality or roughness of an injection-molded plastics material meets the sealing demands placed on such a valve seat. Inserts forming the valve seat as additional components therefore become superfluous, resulting in an advantageous reduction in the number of components of the pressure control valve arrangement.

According to a development, the further housing part forming the valve seat is arranged between the one housing part having the screw connections and the openings for the diaphragms and another housing part, in which the at least one electromagnetic control valve is at least partially received.

This other housing part may also be a plastics injection molding in which at least one magnetic coil of the at least one electromagnetic control valve is molded integrally.

This other housing part may be provided with at least one through-bore for inserting components of the at least one electromagnetic control valve, such as an armature or a magnetic core, a central axis of the through-bore being arranged parallel to the surface normals of the opening edges of the openings for the diaphragms in the one housing part. The at least one through-bore of the other housing part may be closed by a cover.

The at least one valve seat associated with the electromagnetic control valve is then advantageously formed on a surface of the further housing part facing towards the other housing part.

On the basis of the above-described configuration of the components of the pressure control valve arrangement, the method for the production thereof then comprises at least the following further steps:

f) producing at least one valve seat of the at least one electromagnetic control valve in the further housing part, in a surface which faces towards the other housing part, g) producing at least one through-bore in the other housing part of the housing for receiving components of the at least one electromagnetic control valve, such as an armature and/or a magnetic core, a central axis of the through-bore being disposed parallel to the surface normals of the opening edges of the openings for the diaphragms in the one housing part, or parallel to the assembly direction, h) inserting the components of the at least one electromagnetic control valve into the through-bore in the other housing part in the assembly direction, j) placing the other housing part on the further housing part in the assembly direction in such a manner that the at least one valve seat in the further housing part can cooperate with the components of the at least one electromagnetic control valve arranged in the other housing part.

All the essential components of the pressure control valve arrangement, such as the housing parts, the diaphragm valves and the at least one electromagnetic control valve, can then be installed from a single assembly direction, which may be vertically and from above, which has the advantage that resetting in the tool is not necessary during assembly. The assembly direction of the pressure control valve arrangement is therefore defined in particular by the direction of the surface normals of the opening edges of the openings in the one housing part, since the diaphragms are placed in the openings in this direction.

Especially, the housing of the pressure control valve arrangement may consists solely or exclusively of the one housing part, the further housing part and the other housing part. This measure also leads to an advantageously low number of components of the inventive pressure control valve arrangement, which may be a single-channel pressure control valve arrangement.

Further measures improving the exemplary embodiments and/or exemplary methods of the present invention are set out in more detail below together with the description of an exemplary embodiment of the present invention with reference to the drawings.

DETAILED DESCRIPTION

Figure 1:
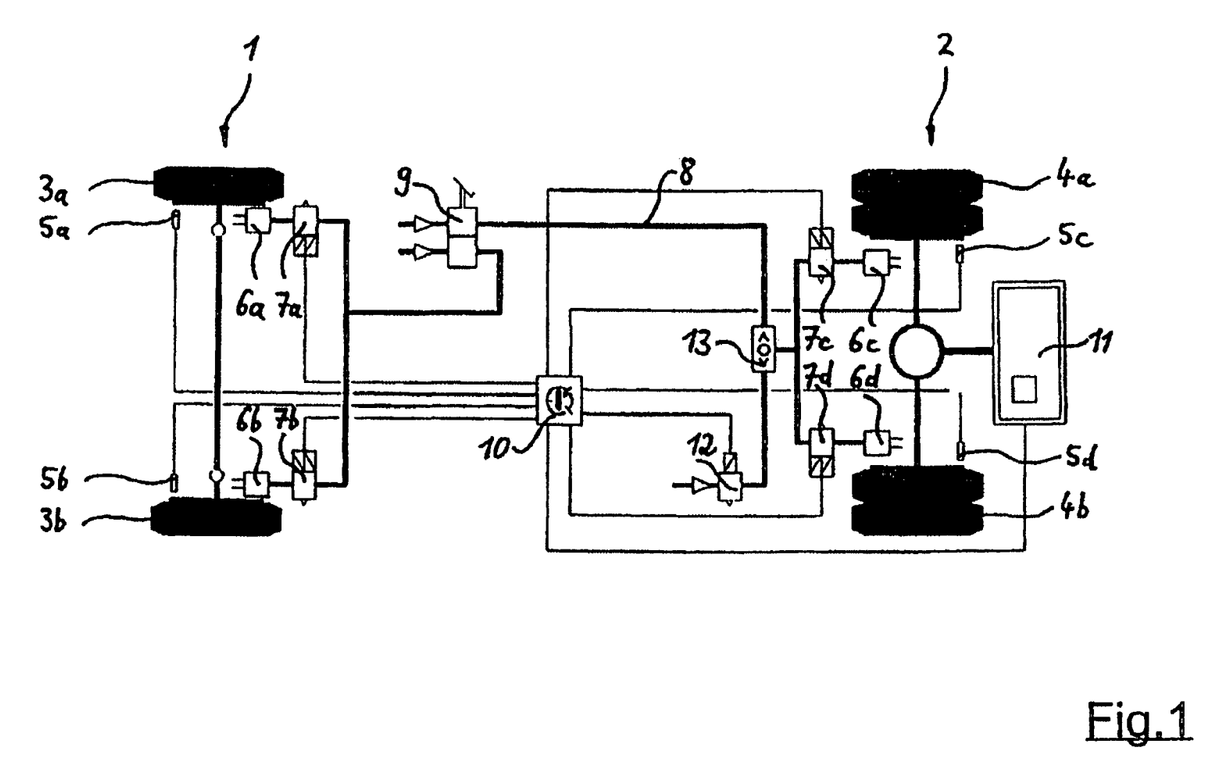
FIG. 1 shows a basic diagram of an ABS brake system as a general schema of a 4S/4K ABS brake system of a vehicle.

As shown in FIG. 1, a vehicle equipped with an ABS brake system comprises a front axle 1 and a rear axle 2. Wheels 3a and 3b are arranged on the front axle 1; the rear axle 2 has, for example, wheels 4a and 4b each equipped with twin tires. The ABS brake system serving to brake these wheels 3a, 3b and 4a, 4b is here in the form of a 4S/4K (four sensors, four channels) system. This means that in this case a total of four rotational speed sensors 5a-5d and four pressure control valve arrangements 7a-7d are available. The pressure control valve arrangements 7a-7d are used to activate respective associated brake cylinders 6a-6d. All the pressure control valve arrangements 7a-7d are connected to a foot brake valve 9 via a branching pneumatic brake pressure line 8.

Upon actuating the foot brake valve 9, the driver generates a brake pressure which, via the pneumatic brake pressure line 8 and passing through the pressure control valve arrangements 7a-7d, is transmitted to the brake cylinders 6a-6d associated with the wheels 3a, 3b and the wheels 4a, 4b.

Figure 2A:
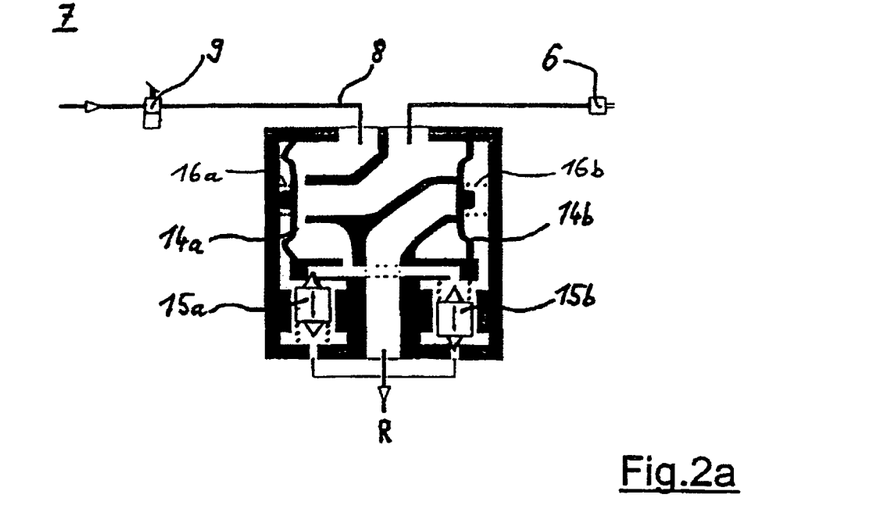
FIG. 2a shows a schematic representation of a pressure control valve arrangement activating a brake cylinder in the open state (pressure build-up).
Figure 2B:
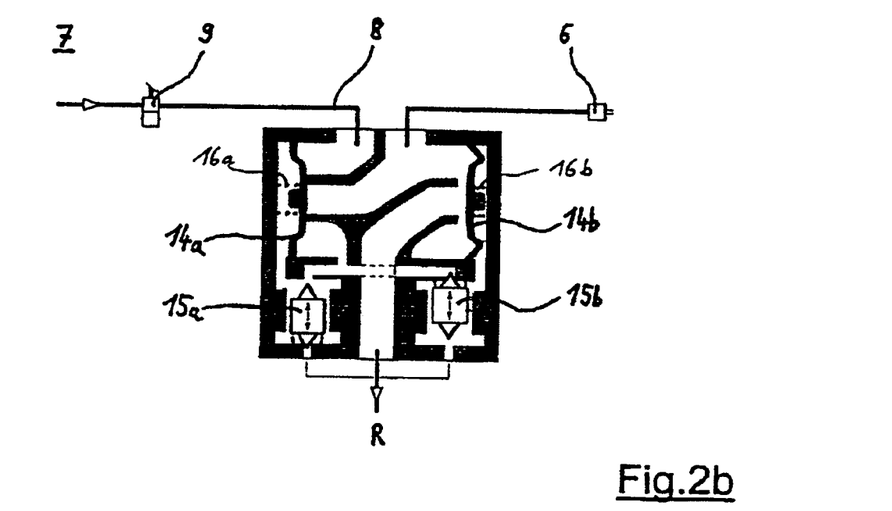
FIG. 2b shows a schematic representation of the pressure control valve arrangement of FIG. 2a in the closed state (pressure reduction).
Figure 4:
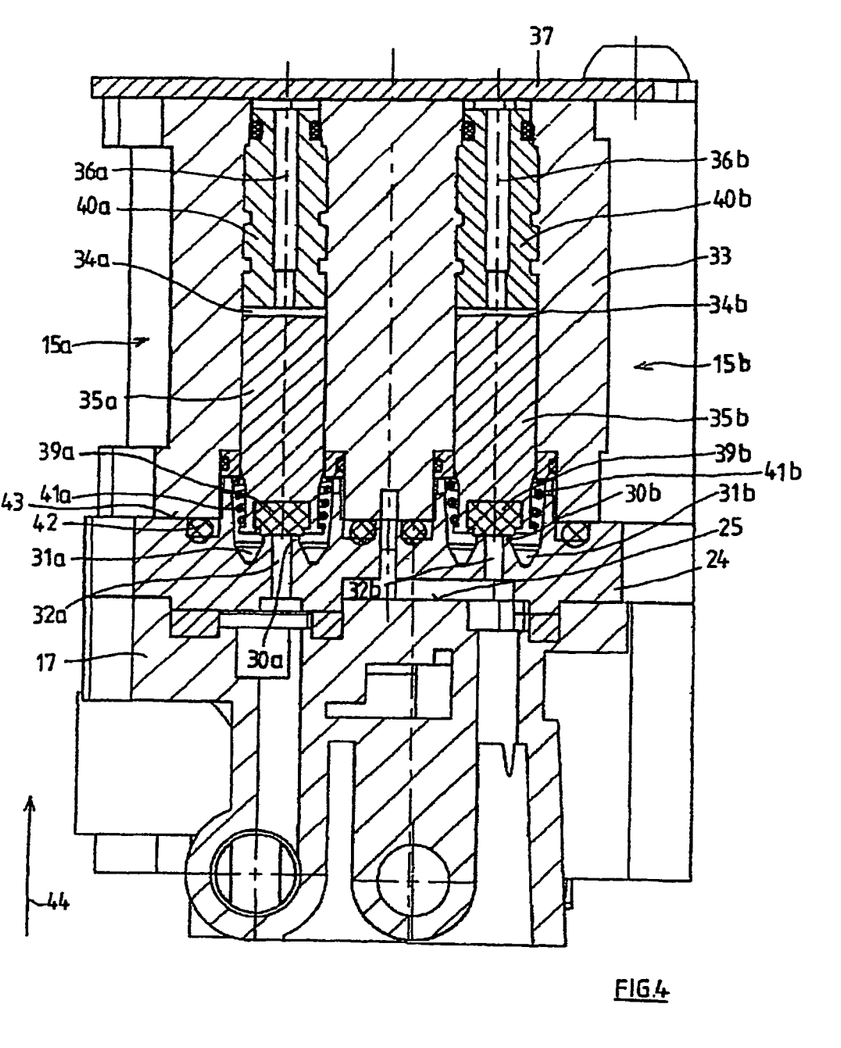
FIG. 4 shows a cross-sectional representation along the line IV-IV of FIG. 3.

The pressure control valve arrangements 7a-7d can be activated via integrated electromagnetic valves 15a, 15b shown in FIG. 2a, FIG. 2b and FIG. 4, and for this purpose are connected electrically to a central electronic control unit 10. The electronic control unit 10 is connected on the input side to the four rotational speed sensors 5a-5b which detect the wheel speeds. In the event of locking of a wheel 3a-3d, the brake pressure induced by the driver via the foot brake valve 9 is reduced by the corresponding pressure control valve arrangement 7a-7d according to an ABS control system as determined by the electronic control unit 10 until the locking is eliminated. The ABS brake system of the present exemplary embodiment further includes an ASR (anti-slip) function which includes an ASR unit 11 for reducing the engine torque, together with an ASR solenoid valve 12 and a shuttle valve 13.

The pressure control valve arrangement 7 as shown in FIG. 2a, which is used for the purpose of ABS control in the context of the ABS brake system, is constructed in this case in the manner of a 1-channel pressure control valve arrangement and consists essentially of two integrated diaphragm valves 14a and 14b, and two spring-loaded electromagnetic valves 15a, 15b activating said diaphragm valves 14a and 14b. The diaphragm valves 14a and 14b are each loaded in the closing direction by respective spring elements 16a, 16b and are pilot-controlled by means of the respective associated electromagnetic valves 15a and 15b.

FIG. 2a shows the pressure control valve arrangement 7 in its open position, in which pressure is built up to the connected brake cylinder 6. In this case neither of the electromagnetic valves 15a and 15b is electrically activated. In the position shown, the compressed air coming from the foot brake valve 9 presses the diaphragm valve 14a configured as the inlet valve open. The normally closed electromagnetic valve 15a prevents the associated diaphragm valve 14a from being closed again. Through the normally open second electromagnetic valve 15b the brake pressure coming from the foot brake valve 9 closes the second diaphragm valve 14b serving as the outlet valve. The compressed air therefore passes through the pressure control valve arrangement 7 unimpeded. The pressure control valve arrangement 7 is also in this state when no ABS control is taking place.

In order to keep the brake pressure constant in a brake cylinder 6a to 6d, only the electromagnetic valve 15a has to be energized, whereby said electromagnetic valve 15a opens and the brake pressure coming from the foot brake valve 9 consequently presses the inlet-side diaphragm valve 14a shut. The pressure on the right and left side of the diaphragm valve 14a is now equal. But because the effective area on the left-hand side of the diaphragm valve 14a is greater, the diaphragm valve 14a is closed. The corresponding situation applies to the outlet-side diaphragm valve 14b which is activated via the electromagnetic valve 15b. In order to maintain the pressure constant, therefore, the pressure control valve arrangement 7 closes the pneumatic brake pressure line 8 running from the foot brake valve 9 to the brake cylinder 6.

As shown in FIG. 2b, a pressure reduction in a brake cylinder 6a to 6d is effected in that both electromagnetic valves 15a and 15b are energized. What was described above regarding the maintaining of pressure applies to the electromagnetic valve 15a and the associated inlet-side diaphragm valve 15a. By contrast, the other electromagnetic valve 15b is closed as a result of the energization. The pressure coming from the brake cylinder 6 therefore presses the outlet-side diaphragm valve 14b open and the brake cylinder 6 is vented.

The above-described operations of the pressure control valve arrangement 7 are executed as determined by the electronic control unit 10 in the context of an ABS/ASR control system of the type described in the introduction.

Figure 3:
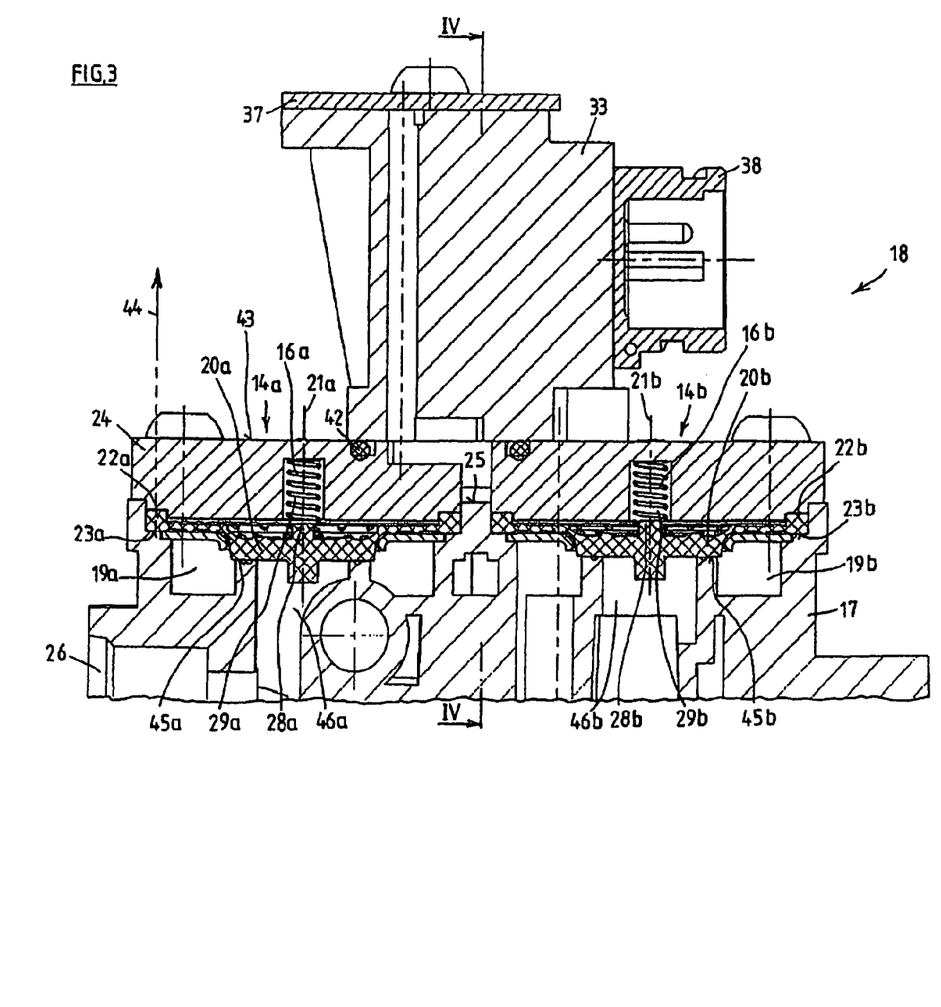
FIG. 3 shows a cross-sectional representation of a concrete configuration of the pressure control valve arrangement of FIG. 2a and FIG. 2b according to an exemplary embodiment of the present invention.

FIG. 3 and FIG. 4 show the pressure control valve arrangement 7, represented only schematically in FIG. 2a and FIG. 2b, in a concrete embodiment and in the installed position; that is to say that the components shown at the top are located at the top. In this embodiment the two electromagnetic valves 15a, 15b for pilot control of the diaphragm valves 14a, 14b are combined in a double solenoid valve, the function of which, however, is analogous to that of single valves 15a, 15b.

Two adjacently arranged openings 19a, 19b for the insertion or inlaying of diaphragms 20a, 20b of the diaphragm valves 14a, 14b are provided in an upper surface of a lower housing part 17, as shown in FIG. 3 and FIG. 4, of a housing 18 of the pressure control valve arrangement 7. In this case the central axes 21a, 21b of the openings 19a, 19b are parallel to one another and aligned vertically. The diaphragms 20a, 20b each cooperate with a respective diaphragm valve seat 45a, 45b, a flow cross-section of a fluid passage 46a, 46b being opened or closed by a diaphragm 20a, 20b, depending on whether the diaphragm 20a, 20b is seated on the diaphragm valve seat 45a, 45b or lifted therefrom.

The diaphragm edges 22a, 22b of the diaphragms 20a, 20b are held between opening edges 23a, 23b of the openings 19a, 19b and a further housing part 24 of the housing 18 of the pressure control valve arrangement 7, the opening edges 23a, 23b of the openings 19a, 19b which may lay in a common plane and the imaginary surface normals of the opening edges 23a, 23b of the openings 19a, 19b, the direction of which is represented by the arrow 44 in FIG. 3 and FIG. 4, being oriented in the same direction, here upwardly. Alternatively, the opening edges 23a, 23b of the openings 19a, 19b might also lie in parallel planes, which in the present case would mean that they would be arranged with a vertical offset according to FIG. 3.

The diaphragms 20a, 20b may be produced by molding from an elastomer such as NBR, and may optionally be joined to one another by injected-on seals.

The further housing part 24 consists, for example, of an intermediate plate which is in contact with an upper surface 25, having the openings 19a, 19b for the diaphragms 20a, 20b, of the lower housing part 17, and is fastened to the lower housing part 17, which may be by being screwed thereto.

All of the screw connections for fluid lines to be connected to the pressure control valve arrangement 7 are formed in the housing part 17, shown at the bottom in FIG. 3 and FIG. 4, which includes the openings 19a, 19b for the diaphragms 20a, 20b, this lower housing part 17 being formed by a light alloy die casting. Especially, the lower housing part 17 may consist of an aluminum die casting. One of these screw connections 26 is shown as an example in FIG. 3. These screw connections 26 may be produced directly—that is, without the provision of threaded inserts—in the lower housing part, for example by tapping.

The spring elements 16a, 16b which load the diaphragms 20a, 20b of the diaphragm valves 14a, 14b bear at one end centrally against the diaphragms 20a, 20b, for example by means of centering pegs 28a, 28b projecting from the diaphragms 20a, 20b, and at the other end against the intermediate plate 24. In order to receive at least partially the spring elements 16a, 16b, the intermediate plate 24 is provided with blind bores 29a, 29b facing towards the lower housing part 17. The spring elements 16a, 16b are, for example, helical springs with what may be vertical spring central axes, so that the direction of movement or action of the diaphragms 20a, 20b is parallel to an assembly direction to be explained later. Upon installation of the intermediate plate 24, therefore, the spring elements 16a, 16b are automatically centered both on the lower housing part 17 and on the intermediate plate 24 and fixed in their installed position.

Especially, the intermediate plate 24 may be formed by a plastics injection molding, for example of polyamide, valve seats 30a, 30b of the electromagnetic valves 15a, 15 being formed integrally with the intermediate plate 24. As is apparent, in particular, from FIG. 4, the valve seats 30a, 30b have a conical configuration in that the surface 43, having the valve seats 30a, 30b, of the intermediate plate 24 is provided with annular blind bore recesses 31a, 31b. Vertically disposed fluid passages 32a, 32b open in the port region in the region of the valve seats 30a, 30b.

The intermediate plate 24 which forms the valve seats 30a, 30b is arranged between the lower housing part 17, which includes the screw connections 26 and the openings 19a, 19b for the diaphragms 20a, 20b, and an upper housing part 33, shown at the top in FIG. 3 and FIG. 4, in which housing part 33 the components of the electromagnetic valves 15a, 15 are received, with the exception of the valve seats 30a, 30b formed in the intermediate plate 24. The valve seats 30a, 30b of the two electromagnetic valves 15a, 15b are formed on the surface 43 of the intermediate plate 24 facing towards the upper housing part 33.

The upper housing part 33 may be provided with two through-bores 34a, 34b for the insertion of components of the electromagnetic valves 15a, 15b, such as their armatures 35a, 35b and magnetic cores 40a, 40b, the central axes 36a, 36b of the through-bores 34a, 34b being arranged parallel to the surface normals, which are oriented in the direction of the arrow 44, of the opening edges 23a, 23b of the openings 19a, 19b in the lower housing part 17. Furthermore, the central axes 36a, 36b of the through-bores 34a, 34b are disposed coaxially with the valve seats 30a, 30b.

The through-bores 34a, 34b of the upper housing part 33 are closed by a cover 37, which may be a stamping of sheet steel. Furthermore, the upper housing part 33 is, for example, a plastics injection molding in which the two magnetic coils (not visible in the figures) of the electromagnetic valves 15a, 15b are molded integrally. The magnetic coils of the electromagnetic valves 15a, 15b may be activated by the electronic control unit 10 via the plug connector housing 38 arranged on the upper housing part 33.

The armatures 35a, 35b of the electromagnetic valves 15a, 15b are guided movably in a vertical direction, that is, parallel to the surface normals 44 of the opening edges 23a, 23b of the openings 19a, 19b for the diaphragms 20a, 20b, in the through-bores 34a, 34b of the upper housing part 33, closing elements 39a, 39b made of an elastomer being arranged, for example, on the ends facing towards the valve seats 30a, 30b. Depending on the energizing of the magnetic coils of the electromagnetic valves 15a, 15b, the armatures 35a, 35b therefore adopt a vertical position in which the closing elements 39a, 39b contact the valve seats 30a, 30b and therefore close the corresponding fluid passages 32a, 32b, or in which they are lifted from the valve seats 30a, 30b and therefore open a flow cross section. The stroke of the armatures 35a, 35b is limited by the magnetic cores 40a, 40b which are inserted in the through-bores 34a, 34b from above and fixed therein. The armatures 35a, 35b are preloaded in the direction of the valve seats 30a, 30b by spring elements 41a, 41b which bear at one end against the armatures 35a, 35b and at the other against the upper housing 33.

Especially, the housing 18 of the pressure control valve arrangement 7 may consist solely or exclusively of three housing parts, namely the lower housing part 17, the intermediate plate 24 and the upper housing part 33. These three housing parts 17, 24 and 33 are, for example, screwed to one another, fluid carrying channels being sealed by seals 42 at the parting planes of the housing parts.

The pressure control valve arrangement 7 is then assembled, here and which may be from above, using at least the following steps, which are carried out in a single, here vertical, assembly direction, without the need for resetting in the tool:

a) molding the diaphragms 20a, 20b of the two diaphragm valves 14a, 14b, the diaphragms 20a, 20b optionally being connected to one another for production reasons by seals (not shown here) which are injected-on or injection molded integrally, b) producing the valve seats 30a, 30b of the electromagnetic valves 15a, 15b in the intermediate plate 24, in the surface 43 which faces towards the upper housing part 33, c) producing the through-bores 34a, 34b in the upper housing part 33 of the housing 18 for receiving components of the electromagnetic valves 15a, 15b, such as the armatures 35a, 35b and the magnetic cores 40a, 40b, the central axes 36a, 36b of the through-bores 34a, 34b being disposed parallel to the surface normals 44 of the opening edges 23a, 23b of the openings 19a, 19b in the lower housing part 17, d) arranging or clamping the lower housing part 17 in such a manner that the surface normals 44 of the opening edges 23a, 23b of the openings 19a, 19b are oriented upwards, e) placing the diaphragms 20a, 20b of the diaphragm valves 14a, 14b from above in the openings 19a, 19b of the lower housing part 17 in such a manner that the diaphragm edges 22a, 22b rest on the opening edges 23a, 23b, and f) optionally removing the injected-on or integrally injection molded seals connecting the diaphragms 20a, 20b, g) placing the spring elements 16a, 16b on the diaphragms 20a, 20b and inserting the spring elements 16a, 16b in the blind bores 29a, 29b of the intermediate plate 24, h) placing the intermediate plate 24 on the lower housing part 17 in such a manner that, on the one hand, the diaphragm edges 22a, 22b are clamped or fixed between the lower housing part 17 and the intermediate plate 24 and, on the other, the spring elements 16a, 16b bear against the diaphragms 20a, 20b and the intermediate plate 24, i) inserting the components of the electromagnetic valves 15a, 15b, such as the armatures 35a, 35b and the magnetic cores 40a, 40b, from below in the through-bores 34a, 34b of the upper housing part 33, j) placing the upper housing part 33 from above on the intermediate plate 24, in such a manner that the valve seats 30a, 30b in the intermediate plate 24 can cooperate with the armatures 35a, 35b of the electromagnetic valves 15a, 15b.

THE LIST OF REFERENCES IS AS FOLLOWS

1 Front axle
2 Rear axle
3 Wheel
4 Wheel
5 Rotational speed sensor

6 Brake cylinder
7 Pressure control valve arrangement
8 Brake pressure line
9 Foot brake valve
10 Control unit
11 ASR unit
12 ASR solenoid valve
13 Shuttle valve
14 Diaphragm valve
15 Electromagnetic valve
16 Spring element
17 Lower housing part
18 Housing
19 Openings
20 Diaphragms
21 Central axes
22 Diaphragm edges
23 Opening edges
24 Intermediate plate
25 Surface
26 Screw connection
28 Centering peg
29 Blind bore
30 Valve seats
31 Blind bore recesses
32 Fluid passages
33 Upper housing part
34 Through-bores
35 Armature
36 Central axis
37 Cover
38 Plug connector housing
39 Closing elements
40 Magnetic cores
41 Spring elements
42 Seals
43 Surface
44 Surface normal
45 Diaphragm valve seat
46 Fluid passage

The invention claimed is:

1. A pressure control valve arrangement for controlling a fluid pressure in an ABS brake system of a vehicle, comprising:
   a housing;
   at least two diaphragm valves, having diaphragms loaded by spring elements, located in the housing; and
   at least one electromagnetic control valve which is activatable by an electronic control device for a pilot control of the diaphragm valves, wherein the brake pressure in associated brake cylinders is adaptively adjustable in the event of a tendency of individual wheels of the vehicle to lock, and wherein the at least one electromagnetic control valve is located in the housing;
   wherein openings for inserting or inlaying the diaphragms are provided in a surface of a housing part of the housing, and wherein edges of the diaphragms are held between opening edges of the openings and a further housing part of the housing,
   wherein the opening edges of the openings lie in a common plane or in parallel planes, and wherein surface normals of the opening edges of the openings are oriented in a same direction,
   wherein the openings for the diaphragms are arranged side-by-side on a surface, so that the diaphragms are inlaid into the openings from a single side, and
   wherein no further components are needed to hold the edges of the diaphragms in the housing, as they are fixed between the one housing part and the further housing part.

2. The pressure control valve arrangement of claim 1, wherein all the screw connections for fluid lines are formed in the housing part having the openings for the diaphragms.

3. The pressure control valve arrangement of claim 2, wherein the housing part having the openings for the diaphragms is formed by a light alloy die casting.

4. The pressure control valve arrangement of claim 1, wherein the spring elements which load the diaphragms of the diaphragm valves bear at one end centrally against the diaphragms and at the other end against the further housing part, and wherein their direction of action is disposed parallel to the surface normals of the opening edges of the openings in the one housing part.

5. The pressure control valve arrangement of claim 4, wherein blind bores, facing towards the one housing part, in the further housing part at least partially receive the spring elements.

6. The pressure control valve arrangement of claim 4, wherein the further housing part is formed by a plate-like plastics injection molding with fluid passages which continue fluid passages formed in the one housing part.

7. The pressure control valve arrangement of claim 6, wherein at least one valve seat of the at least one electromagnetic control valve is formed integrally with the further housing.

8. The pressure control valve arrangement of claim 7, wherein the at least one valve seat of the electromagnetic control valve has a conical configuration and delimits a central fluid passage.

9. The pressure control valve arrangement of claim 7, wherein the valve seat is formed on a surface of the further housing part facing towards the another housing part.

10. The pressure control valve arrangement of claim 7, wherein the housing consists exclusively of the one housing part, the further housing part and the another housing part.

11. The pressure control valve arrangement of claim 7, wherein the housing consists exclusively of the one housing part, the further housing part and another housing part, and wherein the valve control arrangement is a single-channel pressure control valve arrangement.

12. The pressure control valve arrangement of claim 1, wherein the further housing part is arranged between the one housing part and another housing part in which the at least one electromagnetic control valve is received at least partially.

13. The pressure control valve arrangement of claim 12, wherein the another housing part is a plastics injection molding in which at least a magnetic coil of the electromagnetic control valve is molded integrally.

14. The pressure control valve arrangement of claim 13, wherein the another housing part has at least one through-bore for inserting components of the electromagnetic control valve, the components including at least one of an armature and a magnetic core, and wherein a central axis of the through-bore is arranged parallel to the surface normals of the opening edges of the openings in the one housing part.

15. The pressure control valve arrangement of claim 14, wherein the at least one through-bore in the another housing part is closed by a cover.

16. The pressure control valve arrangement of claim 1, wherein the valve control arrangement is a single-channel pressure control valve arrangement.

17. The pressure control valve arrangement of claim 1, wherein screw connections for fluid lines are formed in the housing part having the openings for the diaphragms, wherein the housing part having the openings for the diaphragms is formed by a light alloy die casting, wherein the spring elements which load the diaphragms of the diaphragm valves bear at one end centrally against the diaphragms and at the other end against the further housing part, and wherein their direction of action is disposed parallel to the surface normals of the opening edges of the openings in the one housing part, and wherein the further housing part is arranged between the one housing part and another housing part in which the at least one electromagnetic control valve is received at least partially.

18. The pressure control valve arrangement of claim 17, wherein blind bores, facing towards the one housing part, in the further housing part at least partially receive the spring elements.

19. The pressure control valve arrangement of claim 17, wherein the further housing part is formed by a plate-like plastics injection molding with fluid passages which continue fluid passages formed in the one housing part, and wherein at least one valve seat of the at least one electromagnetic control valve is formed integrally with the further housing part.

20. The pressure control valve arrangement of claim 19, wherein the at least one valve seat of the electromagnetic control valve has a conical configuration and delimits a central fluid passage.

21. The pressure control valve arrangement of claim 20, wherein the valve seat is formed on a surface of the further housing part facing towards the another housing part.

22. The pressure control valve arrangement of claim 17, wherein the another housing part is a plastics injection molding in which at least a magnetic coil of the electromagnetic control valve is molded integrally, wherein the another housing part has at least one through-bore for inserting components of the electromagnetic control valve, the components including at least one of an armature and a magnetic core, and wherein a central axis of the through-bore is arranged parallel to the surface normals of the opening edges of the openings in the one housing part, and wherein the at least one through-bore in the another housing part is closed by a cover.

23. A method for producing a pressure control valve arrangement for controlling a fluid pressure in an ABS brake system of a vehicle, the method comprising:
   molding at least two diaphragms;
   arranging one housing part of a housing so that surface normals of opening edges of openings are disposed parallel to an assembly direction;
   placing the diaphragms of diaphragm valves in the openings in the assembly direction so that diaphragm edges engage in the opening edges;
   placing spring elements on the diaphragms in the assembly direction; and
   placing a further housing part on the one housing part in the assembly direction so that the diaphragm edges are fixed between the one housing part and the further housing part, and so that the spring elements bear against the diaphragms and the further housing part;
   wherein the pressure control valve arrangement includes the housing, at least two diaphragm valves, having the diaphragms loaded by the spring elements, located in the housing, and at least one electromagnetic control valve which is activatable by an electronic control device for a pilot control of the diaphragm valves,
   wherein the brake pressure in associated brake cylinders is adaptively adjustable in the event of a tendency of individual wheels of the vehicle to lock, and wherein the at least one electromagnetic control valve is located in the housing,
   wherein the openings for inserting or inlaying the diaphragms are in a surface of the housing part of the housing,
   wherein the edges of the diaphragms are held between the opening edges of the openings and the further housing part of the housing,
   wherein the opening edges of the openings lie in a common plane or in parallel planes, and wherein the surface normals of the opening edges of the openings are oriented in a same direction,
   wherein the openings for the diaphragms are arranged side-by-side on the surface so that the diaphragms are inlaid into the openings from a single side, and
   wherein no further components are needed to hold the edges of the diaphragms in the housing, as they are fixed between the one housing part and the further housing part.

24. The method of claim 23, further comprising:
   producing at least one valve seat of the at least one electromagnetic control valve in the further housing part in a surface which faces towards the one housing part;
   producing at least one through-bore in the other housing part of the housing for receiving at least some components of the at least one electromagnetic control valve, a central axis of the through-bore being disposed coaxially with the at least one valve seat;
   inserting the components of the at least one electromagnetic control valve in the other housing part; and
   placing the other housing part on the further housing part in the assembly direction so that the at least one valve seat in the further housing part can cooperate with the components arranged in the other housing part of the at least one electromagnetic control valve.

* * * * *

UNITED STATES PATENT AND TRADEMARK OFFICE
CERTIFICATE OF CORRECTION

PATENT NO. : 8,672,421 B2  Page 1 of 1
APPLICATION NO. : 12/737190
DATED : March 18, 2014
INVENTOR(S) : Eidenschink et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Twenty-ninth Day of September, 2015

Michelle K. Lee
*Director of the United States Patent and Trademark Office*